US012654312B2

(12) United States Patent　　　　　(10) Patent No.: US 12,654,312 B2

Galup et al.　　　　　　　　　　　　　(45) Date of Patent: Jun. 16, 2026

(54) SYSTEMS AND METHODS FOR ASSISTING IN OBJECT RECOGNITION IN OBJECT PROCESSING SYSTEMS

(71) Applicant: Berkshire Grey Operating Company, Inc., Bedford, MA (US)

(72) Inventors: Luis Galup, Sudbury, MA (US); Thomas Koletschka, Natick, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 459 days.

(21) Appl. No.: 17/959,009

(22) Filed: Oct. 3, 2022

(65) Prior Publication Data

US 2023/0124854 A1　Apr. 20, 2023

Related U.S. Application Data

(60) Provisional application No. 63/256,397, filed on Oct. 15, 2021.

(51) Int. Cl.
B25J 9/16　　　　(2006.01)
B25J 9/00　　　　(2006.01)
(Continued)

(52) U.S. Cl.
CPC ........... B25J 9/1612 (2013.01); B25J 9/0093 (2013.01); B25J 15/0616 (2013.01); B65G 47/91 (2013.01);
(Continued)

(58) Field of Classification Search
CPC .... B25J 9/1612; B25J 9/0093; B25J 15/0616; B65G 47/91; G06T 1/0014; G06T 7/74;
(Continued)

(56) References Cited

U.S. PATENT DOCUMENTS 4,557,659 A　12/1985　Scaglia
4,786,847 A　11/1988　Daggett et al.
(Continued)

FOREIGN PATENT DOCUMENTS

CA　　2928645 A1　　4/2015
CA　　2928645 C　 * 10/2021　............ B25J 9/1664
(Continued)

OTHER PUBLICATIONS

Communication pursuant to Rules 161(1) and 162 EPC issued by the European Patent Office in related European Patent Application No. 22793988.1 on May 23, 2024, 3 pages.
(Continued)

*Primary Examiner* — Chan S Park
*Assistant Examiner* — Chandhana Pedapati
(74) *Attorney, Agent, or Firm* — Gesmer Updegrove LLP

(57) ABSTRACT

An object recognition system includes: an image capture system for capturing at least one image of an object, and for providing image data representative of the captured image; a patch identification system in communication with the image capture system for receiving the image data, and for identifying at least one image patch associated with the captured image, each image patch being associated with a potential grasp location on the object, each potential grasp location being described as an area that may be associated with a contact portion of an end effector of a programmable motion device; a feature identification system for capturing at least one feature of each image patch, for accessing feature image data in the database and for providing feature identification data responsive to the image feature comparison data; and an object identification system for providing object identify data responsive to the image feature comparison data.

30 Claims, 14 Drawing Sheets

(51) Int. Cl.

| | |
|---|---|
| *B25J 15/06* | (2006.01) |
| *B65G 47/91* | (2006.01) |
| *G06T 1/00* | (2006.01) |
| *G06T 7/73* | (2017.01) |
| *G06V 20/50* | (2022.01) |

(52) U.S. Cl.
CPC .............. *G06T 1/0014* (2013.01); *G06T 7/74* (2017.01); *G06V 20/50* (2022.01)

(58) Field of Classification Search
CPC ........ G06V 20/50; G06V 10/20; G06V 10/25; G06V 10/75; G06V 10/255; G06V 10/46; G06V 10/462; G06V 10/467; G06V 10/757; G06V 2201/06; G06V 20/52
See application file for complete search history.

(56) References Cited

U.S. PATENT DOCUMENTS

| | | | |
|---|---|---|---|
| 4,923,067 A * | 5/1990 | Fuller, Jr | B65G 47/68 209/912 |
| 5,495,097 A * | 2/1996 | Katz | G06K 7/1417 235/462.12 |
| 5,865,487 A | 2/1999 | Gore et al. | |
| 5,937,143 A | 8/1999 | Watanabe et al. | |
| 6,060,677 A | 5/2000 | Ulrichsen et al. | |
| 6,167,607 B1 | 1/2001 | Pryor | |
| 6,721,444 B1 | 4/2004 | Gu et al. | |
| 7,313,464 B1 | 12/2007 | Perreault et al. | |
| 7,474,939 B2 | 1/2009 | Oda et al. | |
| 8,132,835 B2 | 3/2012 | Ban et al. | |
| 9,102,055 B1 | 8/2015 | Konolige et al. | |
| 9,266,237 B2 | 2/2016 | Nomura | |
| 9,283,680 B2 | 3/2016 | Yasuda et al. | |
| 9,492,923 B2 | 11/2016 | Wellman et al. | |
| 9,604,363 B2 | 3/2017 | Ban | |
| 9,687,983 B1 | 6/2017 | Prats | |
| 9,926,138 B1 | 3/2018 | Brazeau et al. | |
| 9,937,532 B2 * | 4/2018 | Wagner | G06K 7/10732 |
| 10,007,827 B2 | 6/2018 | Wagner et al. | |
| 10,369,701 B1 | 8/2019 | Diankov et al. | |
| 10,456,915 B1 | 10/2019 | Diankov | |
| 10,583,986 B2 * | 3/2020 | Wagner | B65G 1/1376 |
| 10,625,305 B2 * | 4/2020 | Wagner | B07C 3/14 |
| 10,625,432 B2 * | 4/2020 | Wagner | B25J 9/1687 |
| 10,758,943 B1 * | 9/2020 | Carpenter | B07C 3/08 |
| 10,913,615 B2 * | 2/2021 | Wagner | B65G 47/12 |
| 11,420,329 B2 | 8/2022 | Wagner et al. | |
| 11,813,744 B2 * | 11/2023 | Wagner | B65G 1/1376 |
| 12,002,240 B2 * | 6/2024 | Taylor | B25J 19/023 |
| 2001/0056313 A1 | 12/2001 | Osborne, Jr. | |
| 2002/0147568 A1 | 10/2002 | Wenzel et al. | |
| 2008/0181485 A1 | 7/2008 | Beis et al. | |
| 2013/0054029 A1 | 2/2013 | Huang et al. | |
| 2013/0266205 A1 * | 10/2013 | Valpola | G06T 7/194 382/153 |
| 2013/0343640 A1 | 12/2013 | Buehler et al. | |
| 2013/0346348 A1 * | 12/2013 | Buehler | G05B 19/423 901/31 |
| 2014/0067127 A1 | 3/2014 | Gotou | |
| 2015/0081090 A1 | 3/2015 | Dong | |
| 2015/0224650 A1 | 8/2015 | Xu et al. | |
| 2016/0167227 A1 | 6/2016 | Wellman et al. | |
| 2016/0221187 A1 | 8/2016 | Bradski et al. | |
| 2016/0245641 A1 * | 8/2016 | Kowdle | G01B 11/026 |
| 2016/0379076 A1 | 12/2016 | Nobuoka et al. | |
| 2017/0021499 A1 | 1/2017 | Wellman et al. | |
| 2017/0050315 A1 | 2/2017 | Henry et al. | |
| 2017/0121113 A1 * | 5/2017 | Wagner | G06K 7/1443 |
| 2017/0136632 A1 | 5/2017 | Wagner et al. | |
| 2017/0173638 A1 * | 6/2017 | Wagner | B07C 5/3412 |
| 2017/0225330 A1 | 8/2017 | Wagner et al. | |
| 2018/0104829 A1 * | 4/2018 | Altman | H01M 10/48 |
| 2018/0273295 A1 * | 9/2018 | Wagner | B65G 1/0485 |

| | | | |
|---|---|---|---|
| 2018/0330134 A1 * | 11/2018 | Wagner | B65G 47/18 |
| 2019/0002202 A1 * | 1/2019 | Collin | B65G 1/0485 |
| 2019/0050670 A1 * | 2/2019 | Pogorelik | G06V 10/40 |
| 2019/0061174 A1 * | 2/2019 | Robinson | B65G 47/917 |
| 2019/0099891 A1 * | 4/2019 | Tomioka | B25J 9/1697 |
| 2019/0337152 A1 * | 11/2019 | Homberg | B25J 9/1697 |
| 2019/0344447 A1 * | 11/2019 | Wicks | B25J 19/02 |
| 2020/0130935 A1 | 4/2020 | Wagner et al. | |
| 2020/0143127 A1 * | 5/2020 | Wagner | B65G 47/91 |
| 2020/0151408 A1 * | 5/2020 | Wagner | B65G 1/1378 |
| 2020/0151409 A1 | 5/2020 | Wagner et al. | |
| 2020/0151410 A1 * | 5/2020 | Wagner | B65G 47/53 |
| 2020/0164505 A1 | 5/2020 | Boer et al. | |
| 2020/0164506 A1 | 5/2020 | Hallock et al. | |
| 2020/0164531 A1 * | 5/2020 | Wagner | B07C 3/18 |
| 2020/0189105 A1 | 6/2020 | Wen et al. | |
| 2020/0242544 A1 | 7/2020 | Galluzzo et al. | |
| 2020/0319627 A1 | 10/2020 | Edwards et al. | |
| 2020/0331144 A1 | 10/2020 | Huang et al. | |
| 2021/0053216 A1 | 2/2021 | Diankov et al. | |
| 2021/0081791 A1 | 3/2021 | Goodrich et al. | |
| 2021/0122586 A1 | 4/2021 | Sun et al. | |
| 2021/0268659 A1 * | 9/2021 | Olmstead | B25J 9/1697 |
| 2021/0276197 A1 * | 9/2021 | Ye | B25J 13/08 |
| 2022/0261738 A1 | 8/2022 | Kumar et al. | |
| 2022/0281114 A1 | 9/2022 | Moreira Rodrigues et al. | |
| 2022/0289502 A1 | 9/2022 | Sun et al. | |
| 2022/0314447 A1 | 10/2022 | Wagner et al. | |
| 2023/0071384 A1 * | 3/2023 | Agarwal | B25J 19/023 |
| 2023/0364787 A1 * | 11/2023 | Cygan | B25J 9/163 |
| 2024/0149460 A1 * | 5/2024 | Matl | B25J 9/1679 |

FOREIGN PATENT DOCUMENTS

| | | | | |
|---|---|---|---|---|
| CN | 103464383 A | 12/2013 | | |
| CN | 102448679 B | 11/2014 | | |
| CN | 102922521 B | 9/2015 | | |
| CN | 103963058 B | 1/2016 | | |
| CN | 118103880 A | 5/2024 | | |
| DE | 3810989 A1 | 8/1989 | | |
| DE | 10319253 A1 | 12/2004 | | |
| DE | 102007028680 A1 | 12/2008 | | |
| DE | 102007038834 A1 | 2/2009 | | |
| DE | 102010002317 A1 | 8/2011 | | |
| DE | 102012102333 A1 | 9/2013 | | |
| DE | 102018126310 B3 * | 11/2019 | | B25J 9/1664 |
| EP | 0317020 B1 | 4/1995 | | |
| EP | 1832947 A2 * | 9/2007 | | B25J 9/1697 |
| JP | 6948033 B1 * | 10/2021 | | B25J 9/1602 |
| WO | WO-2020142296 A1 * | 7/2020 | | |
| WO | 2023064134 A1 | 4/2023 | | |

OTHER PUBLICATIONS

Notification of Transmittal of the International Search Report and the Written Opinion of the International Searching Authority and the International Search Report and Written Opinion issued by the European Patent Office (as the International Searching Authority) in related international application No. PCT/US2022/045556 on Jan. 19, 2023, 14 pages.

Zeng et al., Robotic Pick-and-Place of Novel Objects in Clutter with Multi-Affordance Grasping and Cross- Domain Image Matching, arxiv.org, Cornell University Library, 201 Olin Library Cornell University Ithaca, NY 14853, vol. Version 1, Oct. 3, 2017, 9 pages, Retrieved from the Internet: URL:https://arxiv.org/pdf/1710.013301v1. pdf.

Tareen et al., A Comparative Analysis of SIFT, SURF, KAZE, AKAZE, ORB and BRISK, IEEE 2018 International Conference on Computing, Mathematics and Engineering Technologies, iCoMET 2018, 10 pages.

International Preliminary Report on Patentability issued by the International Bureau of WIPO in related international application No. PCT/US2022/045556 on Apr. 16, 2024, 7 pages.

* cited by examiner

SYSTEMS AND METHODS FOR ASSISTING IN OBJECT RECOGNITION IN OBJECT PROCESSING SYSTEMS

PRIORITY

The present application claims priority to U.S. Provisional Patent Application No. 63/256,397 filed Oct. 15, 2021, the disclosure of which is hereby incorporated by reference in its entirety.

BACKGROUND

The invention generally relates to object processing systems, and relates in particular to object processing systems such as automated storage and retrieval systems, distribution center systems, and sortation systems that are used for processing a variety of objects.

Current object processing systems generally involve the processing of a large number of objects, where the objects are received in either organized or disorganized batches, and must be routed to desired destinations in accordance with a manifest or specific addresses on the objects (e.g., in a mailing system).

Automated storage and retrieval systems (AS/RS), for example, generally include computer controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

Current distribution center sorting systems, for example, generally assume an inflexible sequence of operations whereby a disorganized stream of input objects is first singulated into a single stream of isolated objects presented one at a time to a scanner that identifies the object. A programmable motion device such as a robot, may grasp objects from a container (e.g., a box, bin or tote), one at a time for processing or passage to an induction element (e.g., a conveyor, a tilt tray, or manually movable bins) that transport the objects to a desired destination or further processing station.

In typical parcel sortation systems, human workers or automated systems typically retrieve parcels in an arrival order, and sort each parcel or object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Current state-of-the-art sortation systems rely on human labor to some extent. Most solutions rely on a worker that is performing sortation, by scanning an object from an induction area (chute, table, etc.) and placing the object in a staging location, conveyor, or collection bin. In a system that uses a programmable motion device, such as a robot with an end effector for grasping objects, the objects are not always presented to the programmable motion device in positions or orientations that are most conducive to rapid grasping and processing by the programmable motion device. Human labor, again, may be needed to assist in better presenting the object(s) to the programmable motion device.

There remains a need for more efficient and more cost effective object processing systems that process objects of a variety of sizes and weights into appropriate collection bins or boxes, yet is efficient in handling objects of such varying sizes and weights.

SUMMARY

In accordance with an aspect, the invention provides an object recognition system in communication with a database. The object recognition system includes an image capture system for capturing at least one image of an object, and for providing image data representative of the captured image; a patch identification system in communication with the image capture system for receiving the image data, and for identifying at least one image patch associated with the captured image, each image patch being associated with a potential grasp location on the object, each potential grasp location being described as an area that may be associated with a contact portion of an end effector of a programmable motion device; a feature identification system for capturing at least one feature of each image patch, for accessing feature image data in the database against which each captured at least one feature is compared to provide image feature comparison data, and for providing feature identification data responsive to the image feature comparison data; and an object identification system for providing object identity data responsive to the image feature comparison data, the object identity data including data representative of an identity of an object as well as at least one grasp location on the object.

In accordance with another aspect, the invention provides an object processing system in communication with a database. The object processing system includes an input station at which a plurality of objects may be received; an output station at which the plurality of objects may be provided among a plurality of destination locations; and a processing station intermediate the input station and the output station. The processing station includes: an image capture system for capturing at least one image of an object, and for providing image data representative of the captured image; a patch identification system in communication with the image capture system for receiving the image data, and for identifying at least one image patch associated with the captured image, each image patch being associated with a potential grasp location on the object; a feature identification system for capturing at least one feature of each image patch, for accessing feature image data in the database against which each captured at least one feature is compared to provide image feature comparison data; and an object identification system for providing object identity data responsive to the image feature comparison data, the object identity data including data representative of an identity of an object as well as at least one grasp location on the object.

In accordance with a further aspect, the object recognition system includes an input station at which a plurality of objects may be received; an output station at which the plurality of objects may be provided among a plurality of destination locations; and a processing station intermediate the input station and the output station. The processing station includes: an image capture system for capturing at least one image of an object, and for providing image data representative of the captured image; a patch identification system in communication with the image capture system for receiving the image data, and for identifying at least one image patch associated with the captured image, each image patch being associated with a potential grasp location on the object; a feature identification system for capturing at least one feature of each image patch, for accessing feature image data in the database against which each captured at least one feature is compared to provide image feature comparison data; and an object identification system for providing object identity data responsive to the image feature comparison data, the object identity data including data representative of an identity of an object as well as at least one grasp location on the object.

In accordance with yet a further aspect, the invention provides a method of providing object recognition. The method includes: capturing at least one image of an object, and for providing image data representative of the captured image; receiving the image data, and for identifying at least one image patch associated with the captured image, each image patch being associated with a potential grasp location on the object, each potential grasp location being described as an area that may be associated with a contact portion of an end effector of a programmable motion device; capturing at least one feature of each image patch, for accessing feature image data in the database against which each captured at least one feature is compared to provide image feature comparison data, and for providing feature identification data responsive to the image feature comparison data; and providing object identity data responsive to the image feature comparison data, the object identity data including data representative of an identity of an object as well as at least one grasp location on the object.

BRIEF DESCRIPTION OF THE DRAWINGS

The following description may be further understood with reference to the accompanying drawings in which.

The drawings are shown for illustrative purposes only.

DETAILED DESCRIPTION

In accordance with an aspect, the invention provides an object recognition system in communication with a database. The object recognition system includes an image capture system, a patch extraction system, a feature identification system, and an object identification system (e.g., including a patch matching detector). The image capture system is for capturing at least one image of an object, and for providing image data representative of the captured image. The patch identification system is in communication with the image capture system and is for receiving the image data, and for identifying at least one image patch associated with the captured image, each image patch being associated with (e.g., either defining or including) a potential grasp location on the object, each potential grasp location being described as an area that may be associated with a contact portion of an end effector of a programmable motion device. The feature identification system is for capturing at least one feature of each image patch, for accessing feature image data in the database against which each captured at least one feature is compared to provide image feature comparison data, and for providing feature identification data responsive to the image feature comparison data. The object identification system is for providing object identity data responsive to the image feature comparison data, said object identity data including data representative of an identity of an object and/or weight and/or dimensions of an object, as well as at least one grasp location on the object.

Figure 1:
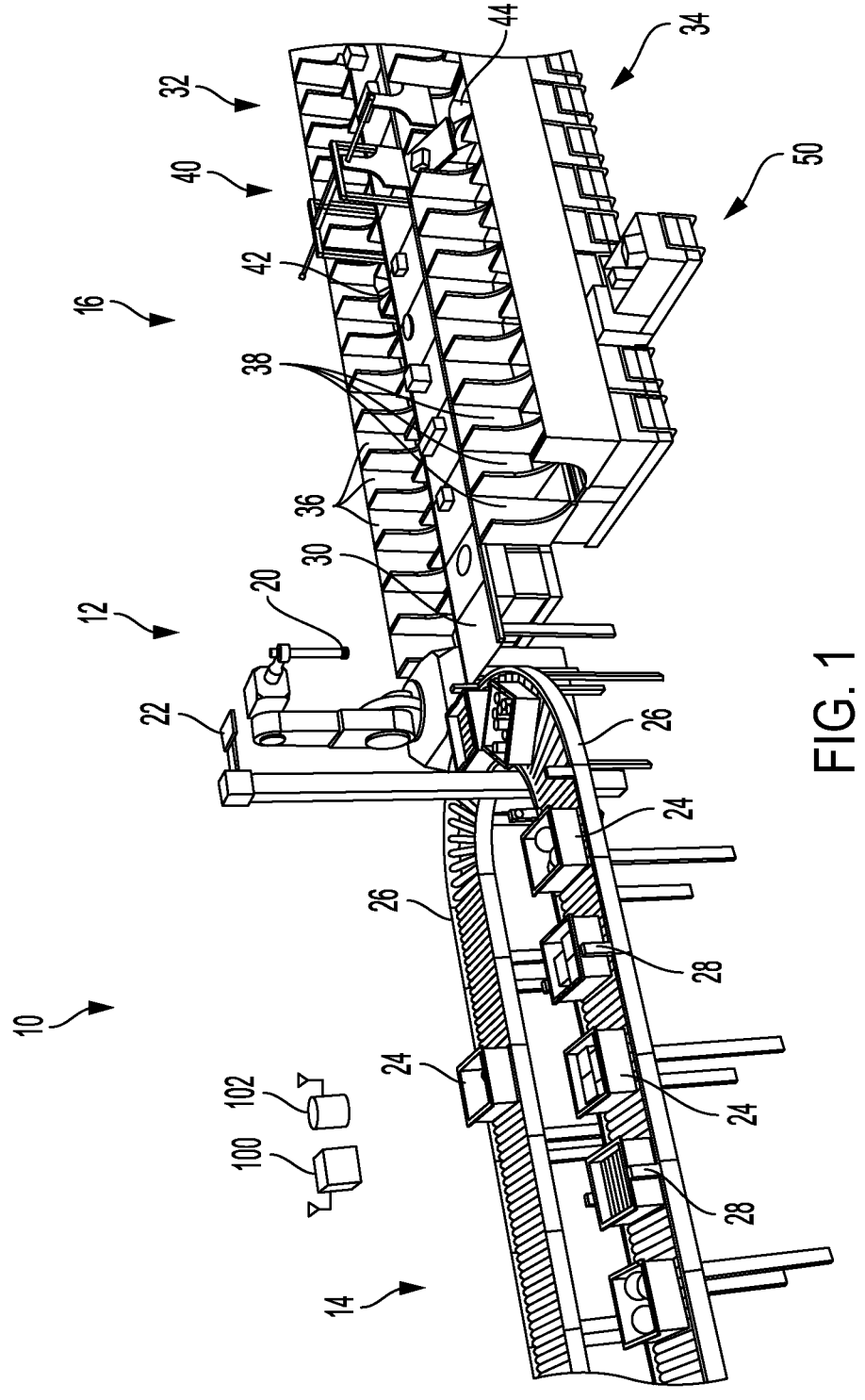
FIG. 1 shows an illustrative diagrammatic view of an object processing system incorporating an object recognition system in accordance with an aspect of the invention.

FIG. 1 shows a system 10 in accordance with an aspect of the present invention that includes a processing station 12 positioned between an input station 14 and an output station 16. The processing station includes a programmable motion device 18 with an end effector 20, and a perception unit 22 that is directed downward at the processing station 12. The input station 14 includes input containers 24 on an input conveyance system 26, and the input conveyance system 26 includes a plurality of container perception units 28 positioned on the conveyance system 26. The output station 16 includes an output conveyance system 30 that travels between rows of shuttle wings 32, 34. Shuttle wing 32 includes a reciprocating carriage 42 that receives an object from the output conveyance system 30 via a diverter 40, and the carriage 42 travels along a track 46 between two rows of destination locations 36. Similarly, shuttle wing 34 includes a reciprocating carriage 44 that receives an object from the output conveyance system 30 via a diverter 40, and the carriage 44 travels along a track 48 between two rows of destination locations 38. Each destination location 36, 38 may include a container, and mutually opposing containers may be provided on a common drawer 50 that may be opened for removing and replacing one or both containers thereon.

Figure 2:
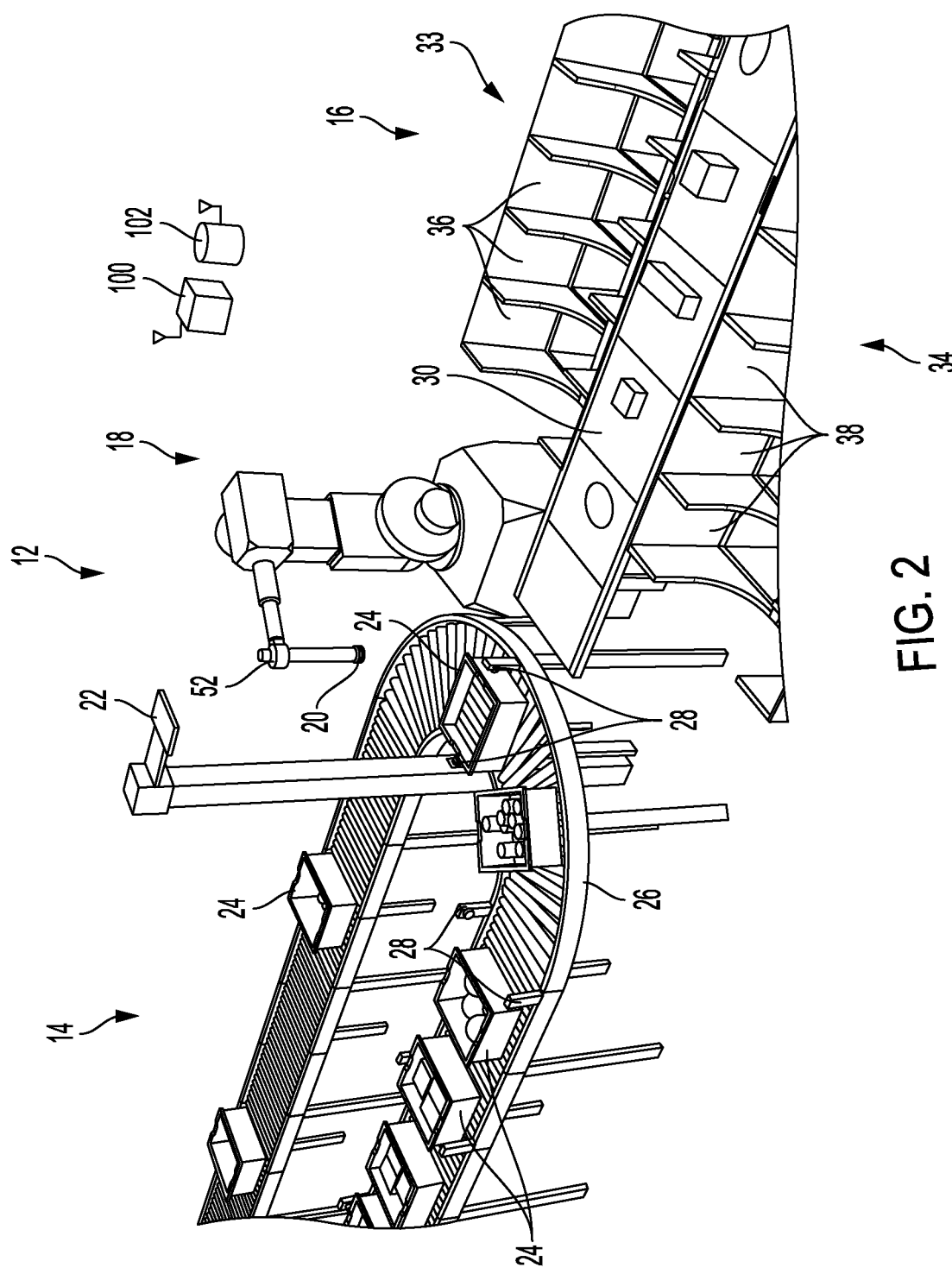
FIG. 2 shows an illustrative diagrammatic view of a portion of the object processing system of FIG. 1 showing an enlarged view of the object processing station of the object processing system.
Figure 3:
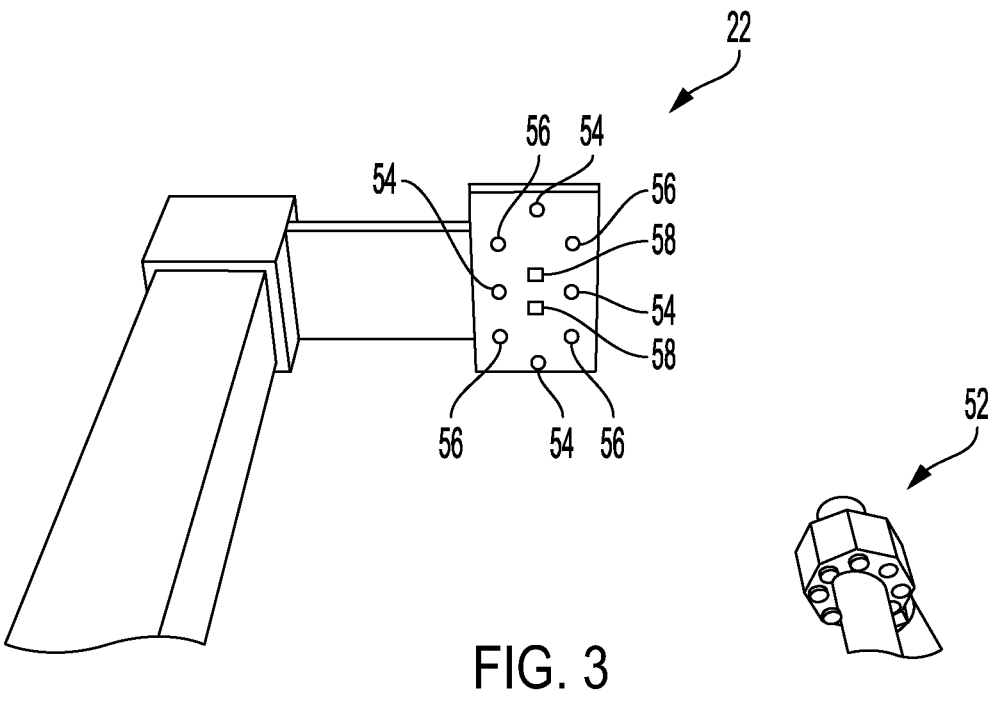
FIG. 3 shows an illustrative diagrammatic underside view of both a stationary perception unit and a perception unit on an articulated arm of the processing station of FIG. 2.
Figure 4:
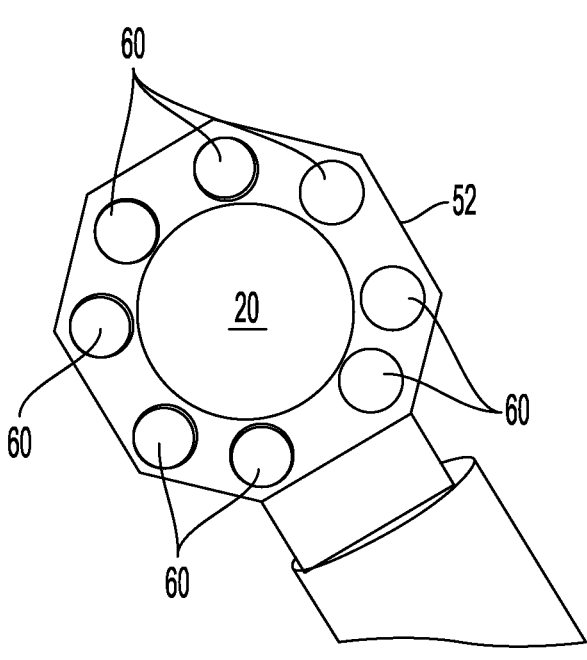
FIG. 4 shows an illustrative diagrammatic enlarged underside view of a portion of the perception unit on the articulated arm of the processing station of FIG. 2.

The end effector 20 of the programmable motion device 18 may be used to move objects from input containers 24 on the input conveyor 26 to the output conveyor 30 as further shown in FIG. 2. The perception unit 22 may be used to identify and analyze objects in an input container 24 at the processing station 12, and a perception unit 52 on the articulated arm 18 may be used to monitor the movement of the end effector 20 as well as the grasping of objects by the end effector 20. FIG. 3 shows the underside of the perception unit 22 with cameras 54, scanners 56, and depth detection units 58. With further reference to FIG. 4, the perception unit 52 includes a plurality of cameras 60 that are directed to areas that encircle the end effector 20. Operation and control of all components of the system may be provided by one or more computer and graphics processing systems 100 in communication with one or more databases 102 as discussed in more detail below.

Figure 5:
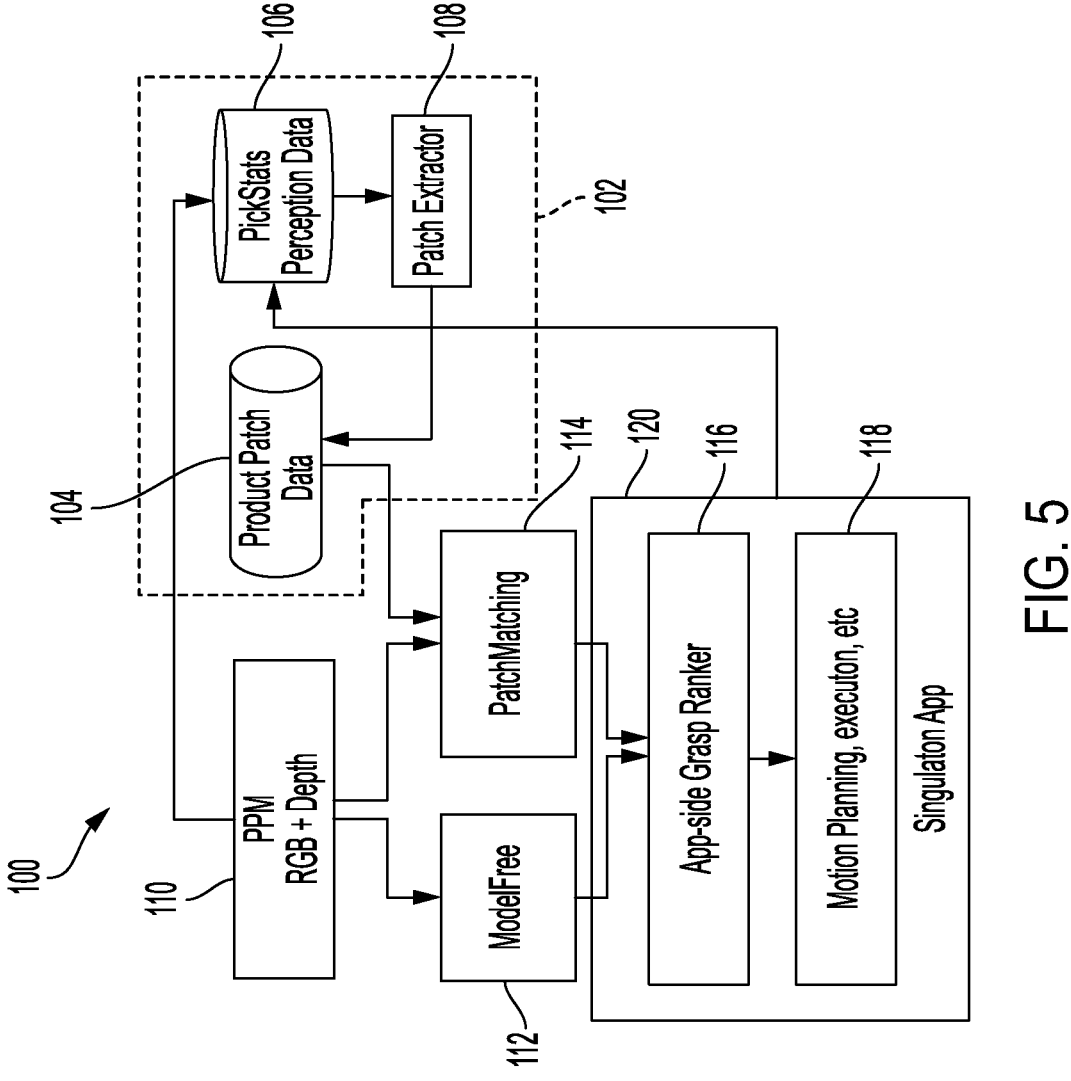
FIG. 5 shows an illustrative diagrammatic functional diagram of an object recognition system in accordance with an aspect of the present invention.

With reference to FIG. 5, the one or more processing systems 100 communicate with a non-transitory memory storage database 102. The database 102 includes a product patch data portion 104 that includes product patch data regarding patch level images and optionally meta-data such as object weight or dimensions relative to the patch, of a large number of objects (e.g., products) from multiple views of the objects. The patches, for example, may include vacuum cup shaped and sized patch level images, as well as object level images of different faces of the objects, each face accommodating one or more grasp locations. The database 102 also includes a pick statistics and perception data portion 106 that includes pick data representative of experienced picks of objects at specific locations as well as statistics regarding any relative successes or concerns in connection with such experienced picks. The pick statistics and perception data portion 106 also includes perception data regarding perception information in connection with specific objects immediately prior to experienced picks of the objects at specific locations. The pick statistics and perception data portion 106 communicates with a patch extractor 108, which provides patch data to the product patch data portion 104.

The one or more computer processing systems 100 includes a product patch module 110 that provides color data representative of color (rgb) information of pixels each captured image of an object, as well as depth data representative of depth perception information of the captured images of the object. This color data and depth data is provided to the pick statistics and perception data portion 106 as well as to a model free module 112 and a patch matching module 114. The service interface is the same. The model free module 112, for example, provides baseline grasp selection and operates well in new domains (e.g., different SKUs, different sensors, different containers, different cell set-ups etc.). The patch matching module 114 operates as a mode free equivalent node in the system, receiving point cloud and color (rgb) data and container presence detection as input. The patch matching module 114 is also able to learn fast from small amounts of data, may associate other meta-data with re-detected grasps and/or product sides.

The patch matching node uses a model loader class that loads object patches, and extracts features at run-time, saving and loading pre-processed features, as required, for example, in accordance with dynamically changing requirements. A perception interface on an application side triggers the configured set of group detectors (e.g., model free and patch matching) and returns their combined list of grasps. In accordance with an aspect, the system uses an order-feature-grasp-ranker routine 116 to, for example, prioritize patch matches over model free grasps. The system may further flag grasp locations that are suspected of being occluded. A motion planning and execution routine 118 is then employed, which together with the order-feature-grasp-ranker routine 116 are provided as part of a singulation application 120.

Figure 6:
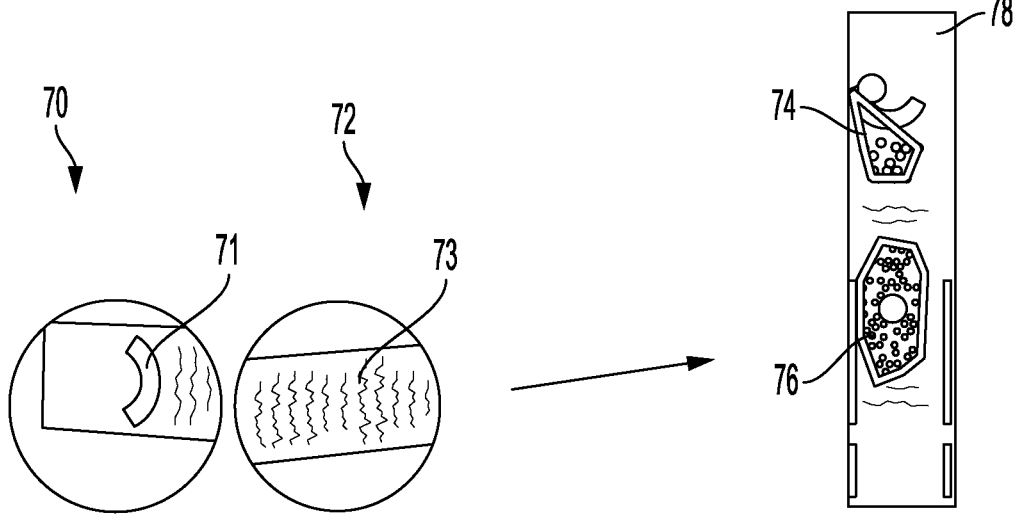
FIG. 6 shows an illustrative diagrammatic pictorial representation of vacuum cup-level patches and their associated patch portions on objects.
Figure 7:
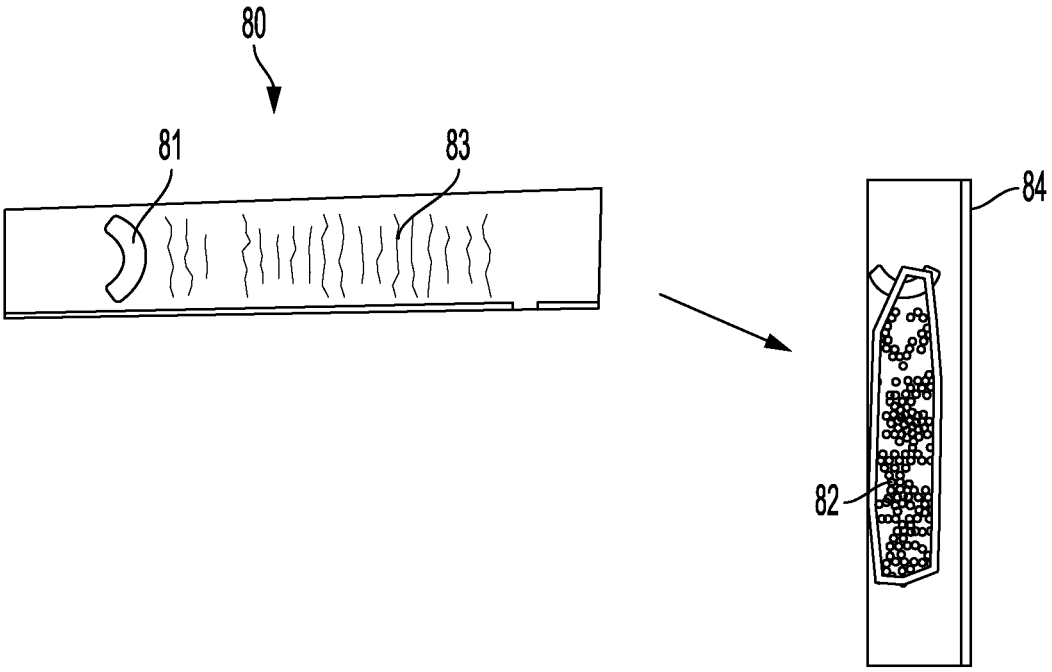
FIG. 7 shows an illustrative diagrammatic pictorial representation of object-level patches and their associated patch portions on objects.

FIG. 6 shows vacuum cup level patches 70, 72, each of which includes a feature 71, 73 respectively. These patches 70, 72 including the features 71, 73 may be associated with patch portions 74, 76 of a side of an object 78. FIG. 7 shows object-level patches 80 that includes features 81, 83, and the patch 80 including the features 81, 83 may be associated with a patch portion 82 of a side of an object 84. There are several possible ways to obtain patches. For example, patches may be obtained from successful grasp points, patches may be obtained for full objects from pre or post picks, patches may be obtained from pre and post-placement, patches may be obtained from product pictures, and patches may be obtained from an object-level by pose-in-hand (PIH) camera systems. Cup-level patches may be kept below certain storage sizes, and object-level patch sizes may vary depending on the size of the object(s). Current image patch and computing features may be stored at loading time and/or may be cached for improved access.

The system in accordance with an aspect detects (or re-detects) product image patches in a scene to generate grasp points. Generally, a system may generate a set of N images representing an object and/or successful grasp points, using therefore any of grasp-patches or object patches. In accordance with an aspect, features of each patch may be matches with features from a current image of a container (e.g., tote, bin, box etc.) or individual object. Features of each patch are matched with features from a current container image (of objects), using, for example computer vision. Each feature match votes for the center of the patch, and the system engages clustering to find patch detections in the scene.

Figure 8:
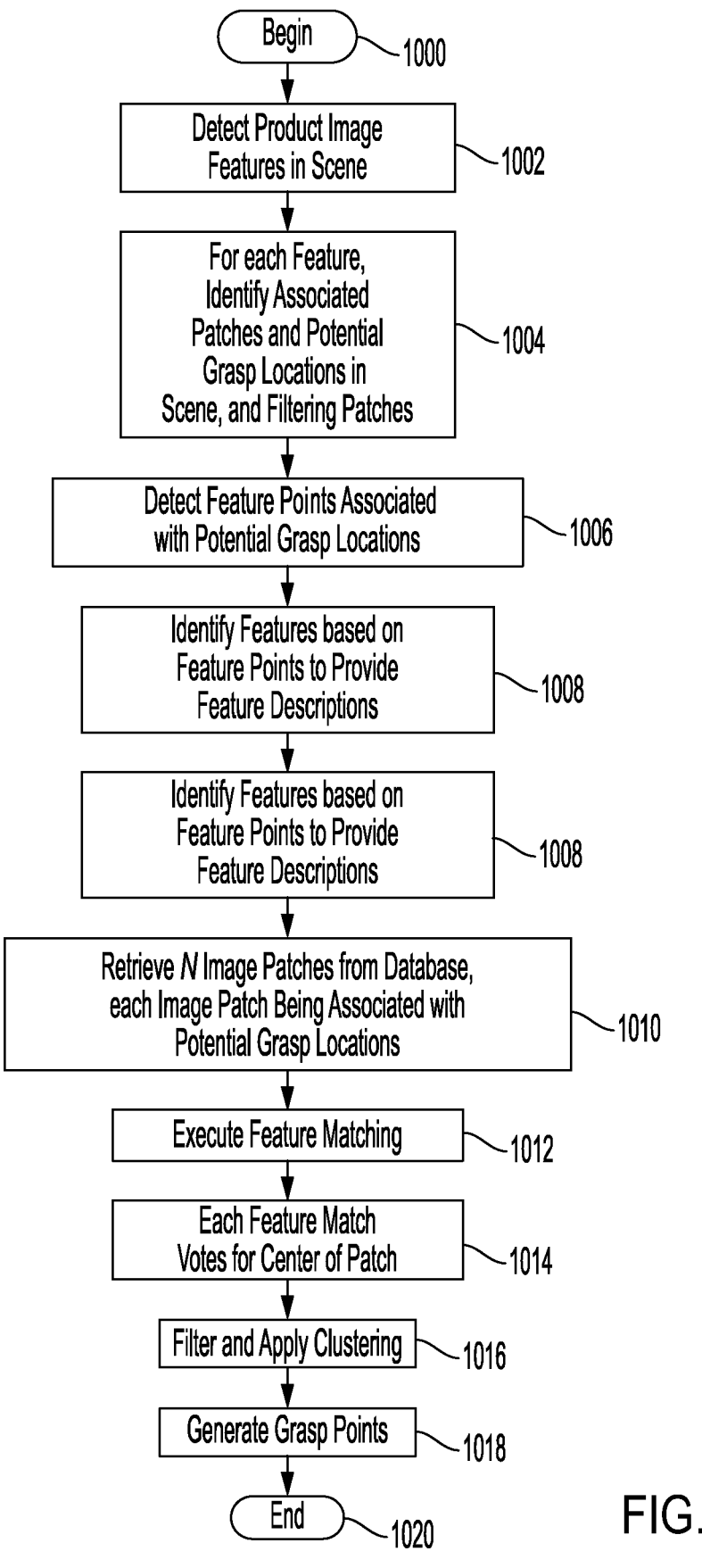
FIG. 8 shows an illustrative flowchart of the processing steps in an object recognition system in accordance with an aspect of the present invention.

In particular, and with reference to FIG. 8, a process flow in accordance with an aspect of the present invention begins (step 1000) with detecting product image features in a scene (step 1002) that includes an input container. For each feature, the system will identify associated patches and potential grasp locations in a scene, and filtering is applied to the patches (step 1004). The filtering may involve, for example, removing duplicates, removing patches that are partially occluded, and removing patches that are too far off of a center of the object. The system will then detect feature points associated with potential grasp locations (step 1006) and identify features based on the feature points to provide feature descriptions (step 1008). Features of each patch therefore get matched with features from the current input container. The feature detector routine detects feature points in an image. The features may generally be detected in the form of any of edges, junctions, lines, corners, localized standout areas of different colors, and localized standout areas of brightness. Feature detector routines, such as for example, Speeded-Up Robust Features (SURF), scale invariant feature transform (SIFT), KAZE, accelerated KAZE (AKAZE), Binary Robust Invariant Scalable Keypoints (BRISK), binary robust independent elementary features (BRIEF), features from accelerated segment test (FAST), and oriented FAST and rotated BRIEF (ORB), are among the fundamental scale, rotation, and affine invariant feature-detectors (each with a feature description) that may be used in accordance with certain aspects. See for example, *A Comparative Analysis of SIFT, SURE, KAZE, AKAZE, ORB and BRISK*, IEEE 2018 International Conference on Computing, Mathematics and Engineering Technologies, Shaharyar Ahmed Kahn Tareen and Zahra Saleem, iCoMET 2018. In accordance with further aspects, learning algorithm-based keypoints or descriptors may be used, as well as non-keypoint-based features such as blobs, shapes, etc. The detected features are subsequently described in logically different ways on the basis of unique patterns possessed by their neighboring pixels.

The system may then retrieve N image patches from the database 102, each image patch being associated with one or more potential grasp locations (step 1010) representing an object and/or known successful grasp points. The image patches may be, for example, vacuum cup-level patches or object level patches. The features of each patch are then matched with features of the current input container image (step 1012). The feature matching, for example, may be performed by using $L_1$-norm or $L_2$-norm for string based descriptors (e.g., SIFT, SURF) or Hamming distance of binary descriptors (e.g., AKAZE, ORB, BRISK). Different matching strategies may be adopted for matching features such as threshold based matching, nearest neighbor, nearest neighbor distance ratio etc. Each feature match then votes for the center of the patch (step 1014). The system may optionally include the rejection of bad detections and/or duplicate detections (filtering), and clustering is then applied (step 1016), and grasp points are thereby generated (step 2018) prior to the program ending (step 1020).

The system may therefore, query the last N successful patch matching grasps since the last query. The system may then extract a patch by projecting a cup region at a grasp point into a pre-pick image. If a number of features therein is too low, the patch may be discarded. The patch is then compared to a set of existing patches for the product, and a decision is made whether to add (merge) the patch or discard it (based for example, on matching a new patch to existing patches). It may further be advantageous to detect patches that may not match each other but may be very close to each other on the product. Patch statistics may be generated over their lifetime and patches may be ranked, rejected or adjusted over time (e.g., using pose-in-hand data) depending on use (e.g., where the product's appearance changes over time). The pose-in-hand (PIH) data may also be used to adjust grasp points (e.g., to move towards a center of mass). Additionally, PIH volume may be associated with patches over time. Extracting a full object's appearance may facilitate ignoring picks of occlude objects. Such processes may further improve performance on flat items, and inform cup selection for high aspect ratio SKUs (thin side up vs. large side up). The system may also utilize information regarding 1) object handling parameters (e.g., different scale duration if object is upright vs. sideways), and 2) object placement based on estimated object pose. With regard to object placement, the system may either just use the grasp information directly if placement does not need to be highly accurate, or inform the grasp pose of PIH scan pose to improve placement outcome.

Figure 9:
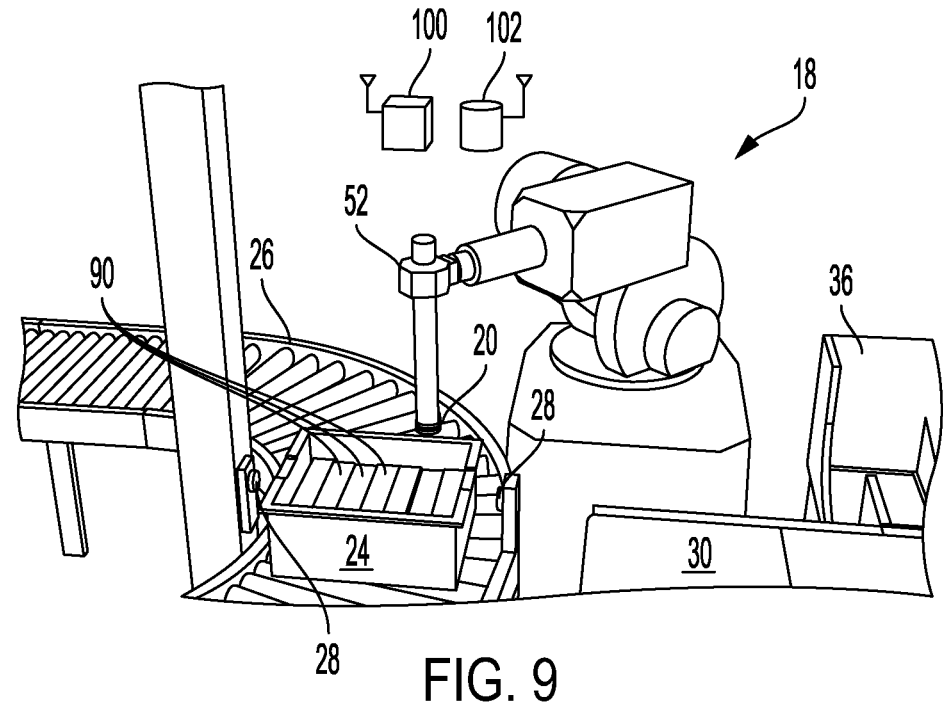
FIG. 9 shows an illustrative diagrammatic enlarged view of a programmable motion device processing a homogenous container in a system in accordance with an aspect of the present invention.
Figure 10:
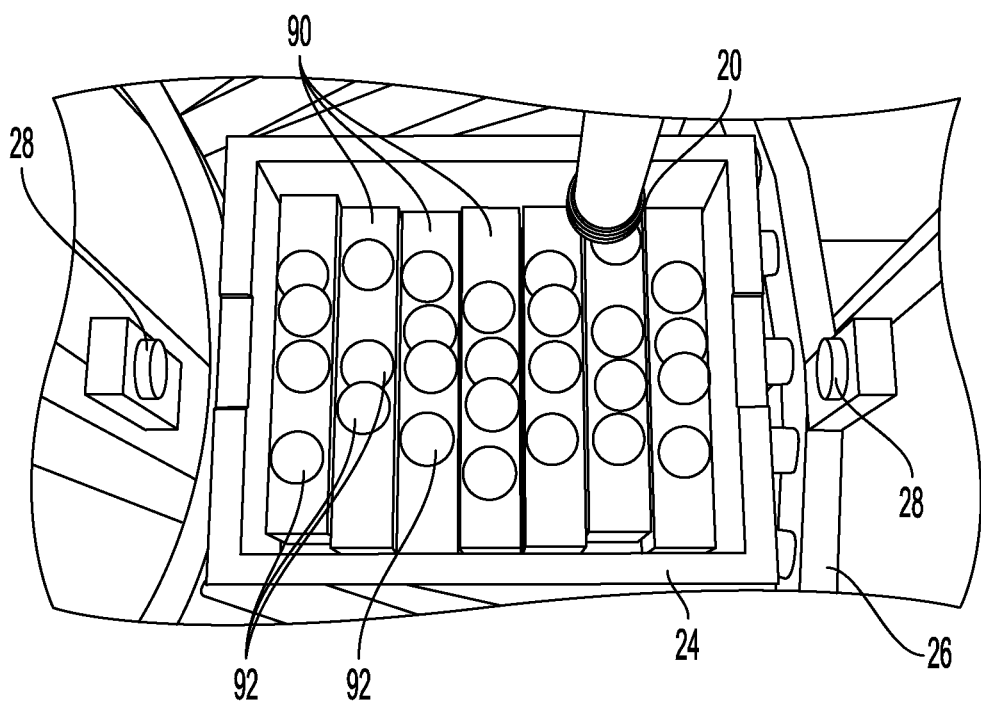
FIG. 10 shows an illustrative diagrammatic elevated view of the homogenous container of FIG. 9 showing candidate patches on the objects.
Figures 11A, 11B:
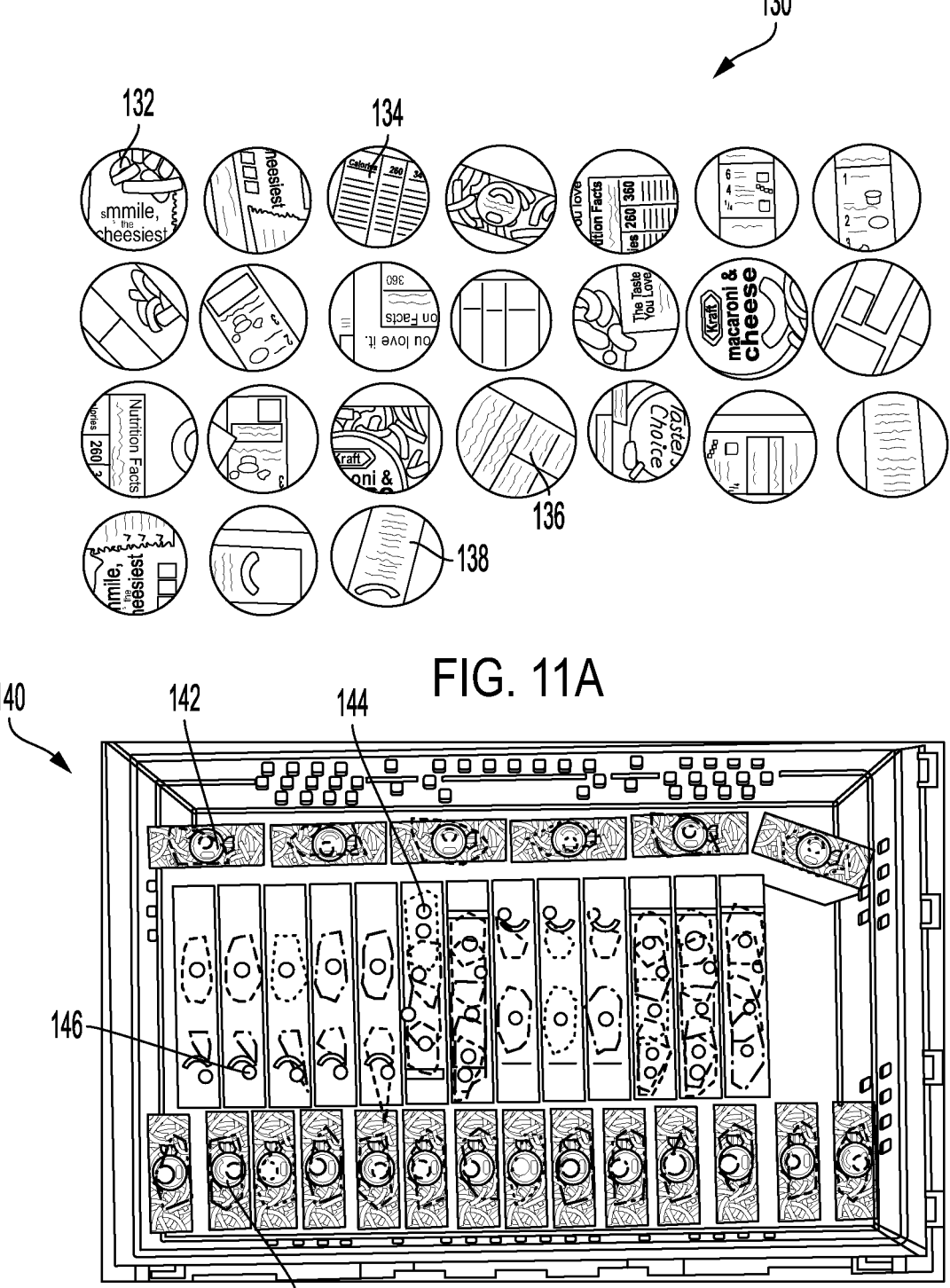
FIGS. 11A and 11B show illustrative diagrammatic pictorial representations of stored cup-level image patches (FIG. 11A) and system patch data regarding patches on objects (FIG. 11B)

FIG. 9 shows the programmable motion device 18 at the processing station 12, wherein the end effector 20 is being positioned to grasp any of the objects 90 within the input container 24. Container perception units 28 may be used to verify the position and location of the container 24 on the input conveyance system 26. With reference to FIG. 10, the system may, through the processes discussed above, select any of the patches 92 as grasp locations on the objects 90 within the input container 24. FIG. 11A shows at 130 a plurality (e.g., 24) of stored cup-level image patches to be compared with the cup-level image patches on the objects. With reference to the patches at 132, 134, 136, 138, the patches may vary in size and shape. FIG. 11B shows at 140 the patch data of the system on the objects being compared with the stored cup-level image patches. As shown at 142, 144, 146, 148, the size and shape of the patches may vary according to features being captured.

Figure 12:
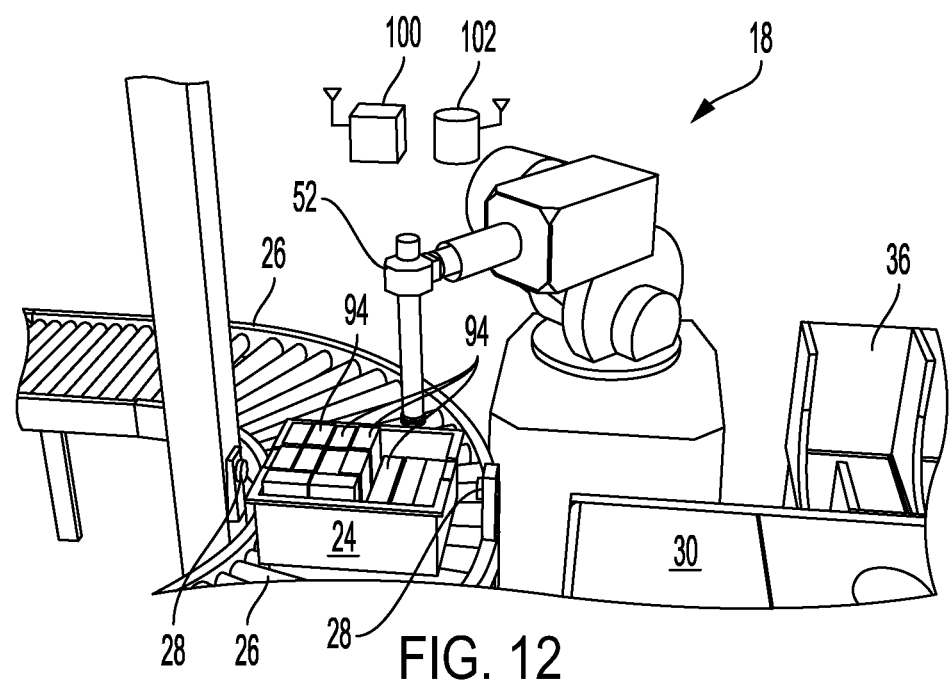
FIG. 12 shows an illustrative diagrammatic enlarged view of a programmable motion device processing a heterogenous container using object-level patches in a system in accordance with an aspect of the present invention.
Figure 13:
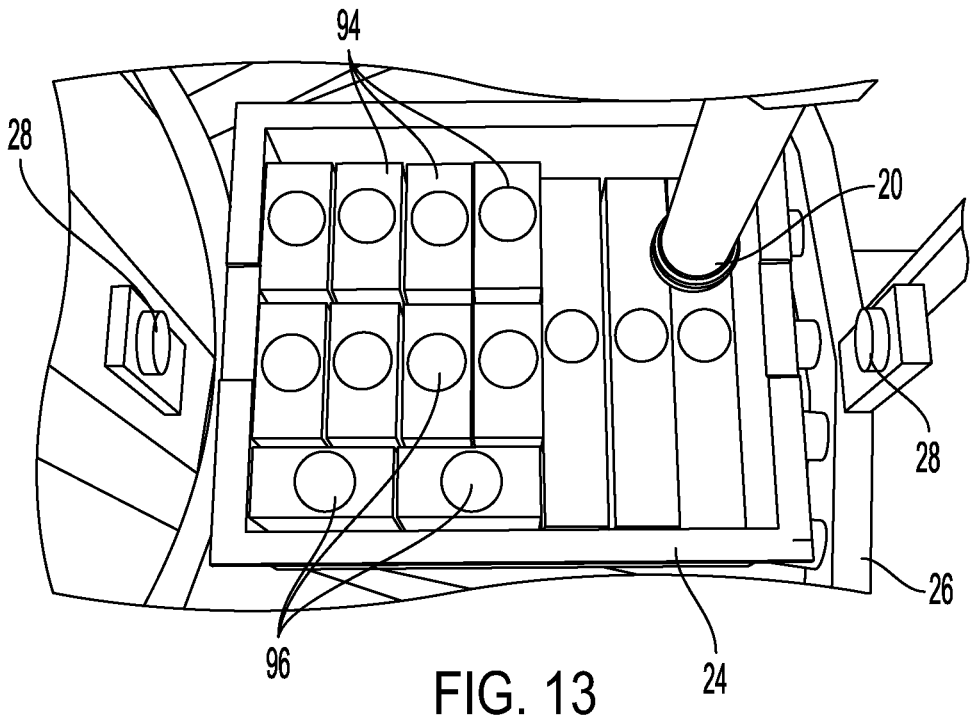
FIG. 13 shows an illustrative diagrammatic elevated view of the heterogenous container of FIG. 12 showing candidate patches on the objects.
Figure 14A:
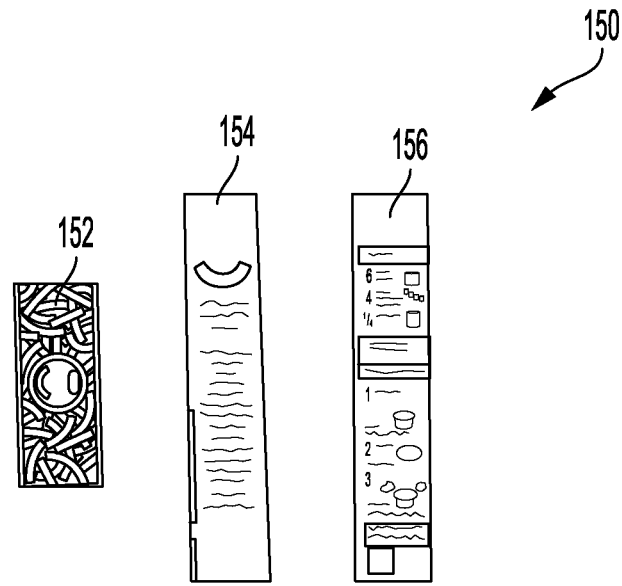
FIGS. 14A and 14B show illustrative diagrammatic pictorial representations of stored object-level image patches (FIG. 14A) and system patch data regarding patches on objects (FIG. 14B)
Figure 14B:
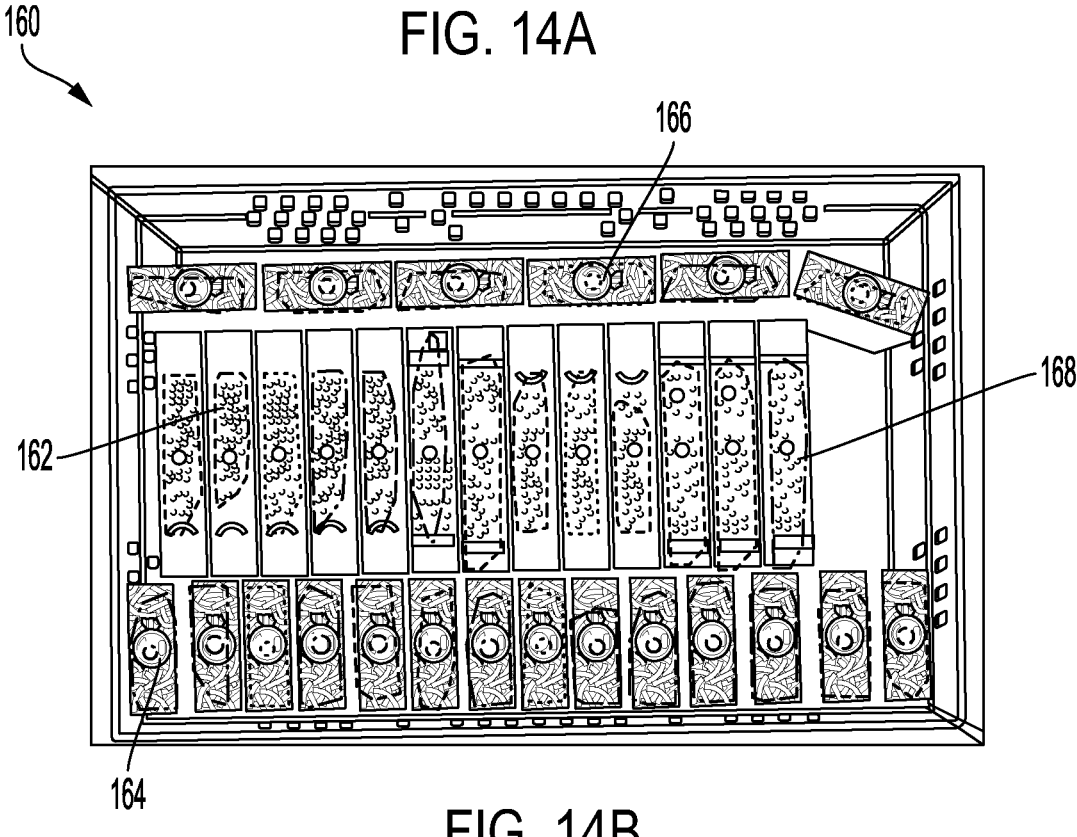

FIG. 12 shows the programmable motion device 18 at the processing station 12, wherein the end effector 20 is being positioned to grasp any of the objects 94 within the input container 24. Again, container perception units 28 may be used to verify the position and location of the container 24 on the input conveyance system 26. With reference to FIG. 13, the system may, through the processes discussed above, select any of the object-level patches 96 that include grasp locations on the objects 94 within the input container 24. FIG. 14A shows at 150 a plurality of stored object-level image patches to be compared with the object-level image patches on the objects. The object-level patches 152, 154, 156 may vary in size and shape depending on the objects. FIG. 14B shows at 160 the patch data of the system on the objects being compared with the stored object-level image patches. As shown at 162, 164, 166, 168 the patches may vary in size and shape depending on the objects and features being captured.

Figure 15:
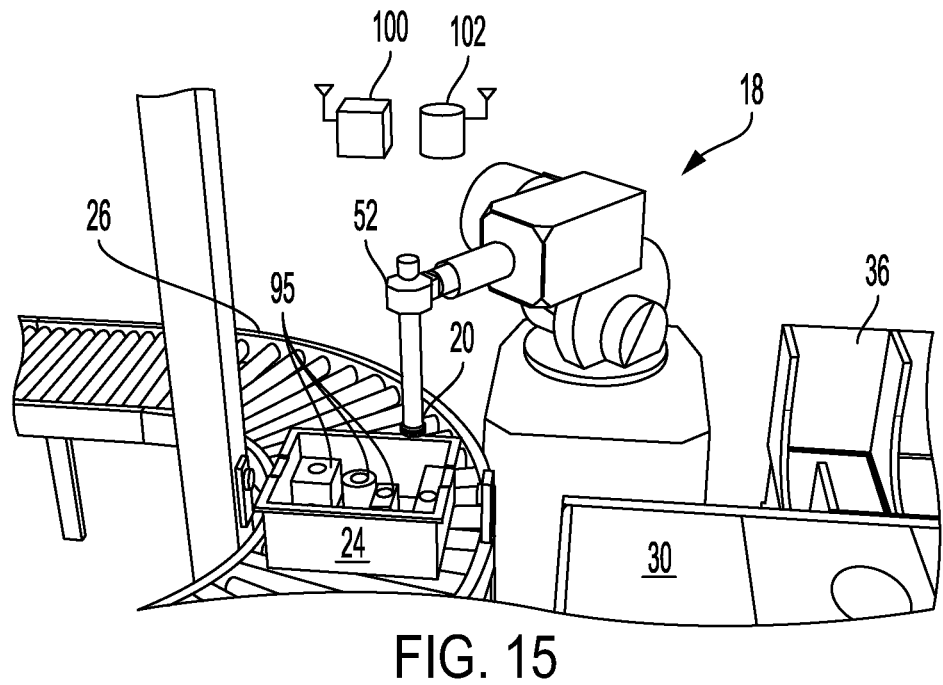
FIG. 15 shows an illustrative diagrammatic enlarged view of a programmable motion device processing a more widely heterogenous container using cup-level and object-level patches in a system in accordance with an aspect of the present invention.
Figure 16:
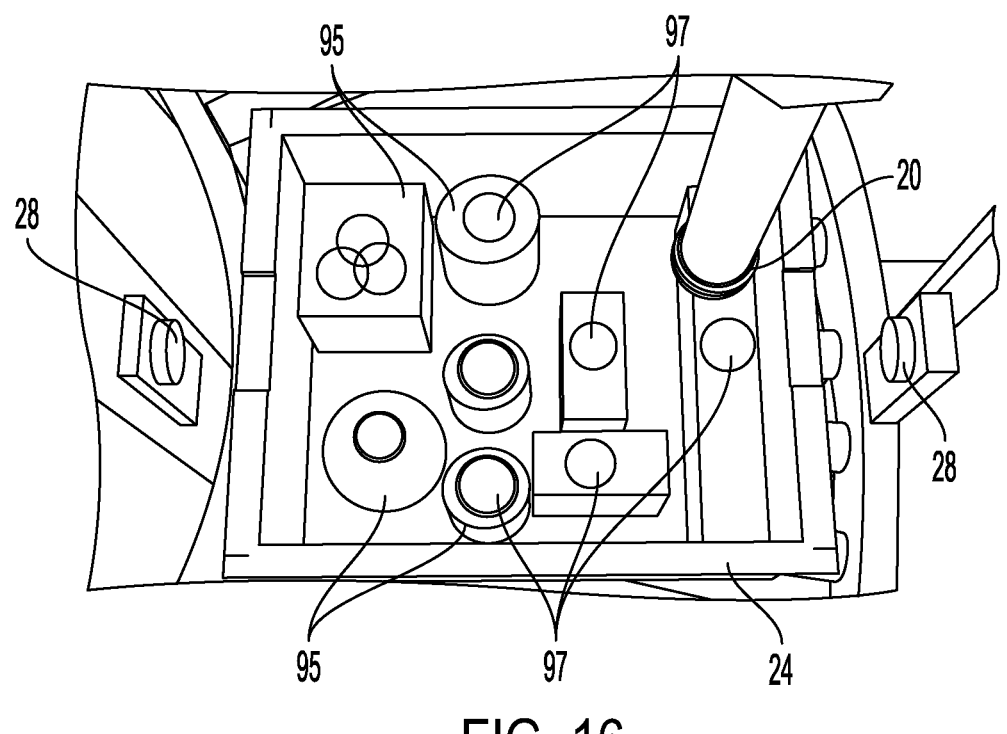
FIG. 16 shows an illustrative diagrammatic elevated view of the heterogenous container of FIG. 15 showing candidate patches on the objects.

FIG. 15 shows the programmable motion device 18 at the processing station 12 wherein the end effector 20 is being positioned to grasp any of a set of heterogenous objects 95 within the input container 24. Again, the perception units 28 may be used to verify the position and location of the container 24 on the input conveyance system 26. With reference to FIG. 16, the system may, through the processes discussed above, select any of the patch-level or object-level patches 97 that include grasp locations on the heterogenous objects 95. The system may either send a grasp request regarding a specific SKU, or may specify a list of different SKUs in the container 24, with a grasp proposed for each of the objects identified. The system may then determine which object to pick in which order. In this case, a manifest would indicate the list of objects and which patches may be identified associated with each object. Systems in accordance with various of the above aspects may use the detected patch(es) to inform resulting processing behavior, parameters or trajectory in some way. For example, an object may have handling parameters specific not to the object but to the patch detected and/or its orientation.

Figure 17:
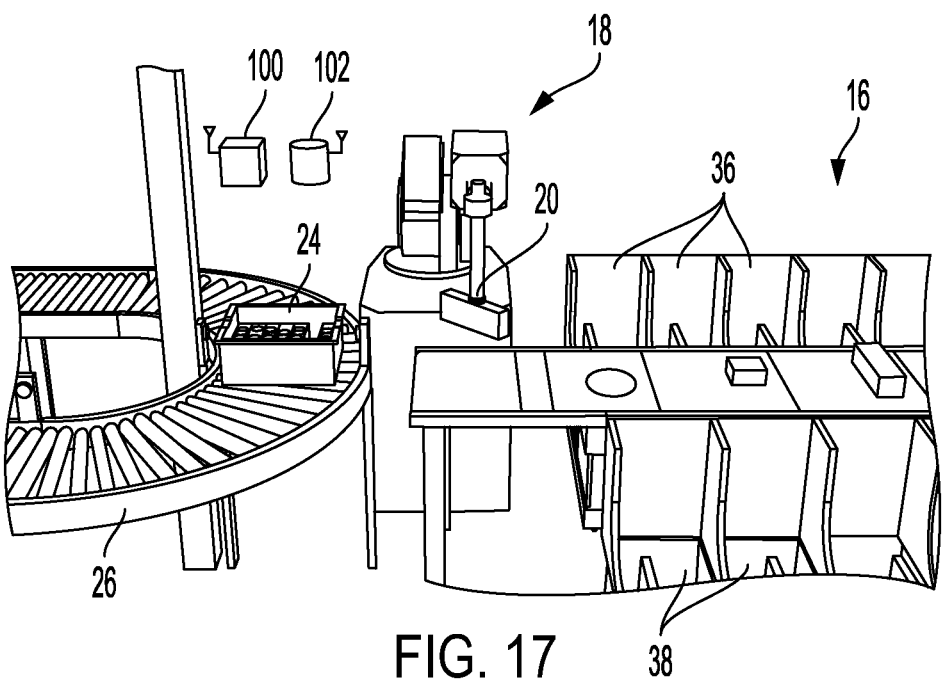
FIG. 17 shows an illustrative diagrammatic enlarged view of a programmable motion device processing a container in a system in accordance with an aspect of the present invention in which the processed objects are placed onto a secondary conveyor system.
Figure 18:
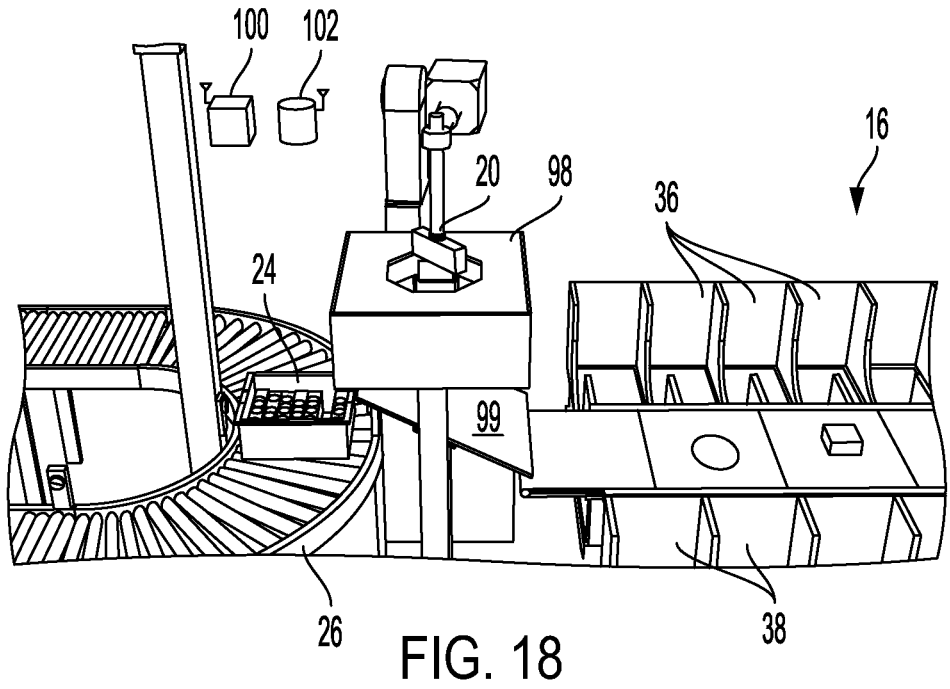
FIG. 18 shows an illustrative diagrammatic enlarged view of a programmable motion device processing a container in a system in accordance with an aspect of the present invention in which the processed objects are dropped through a drop scanner onto a secondary conveyor system.
Figure 19:
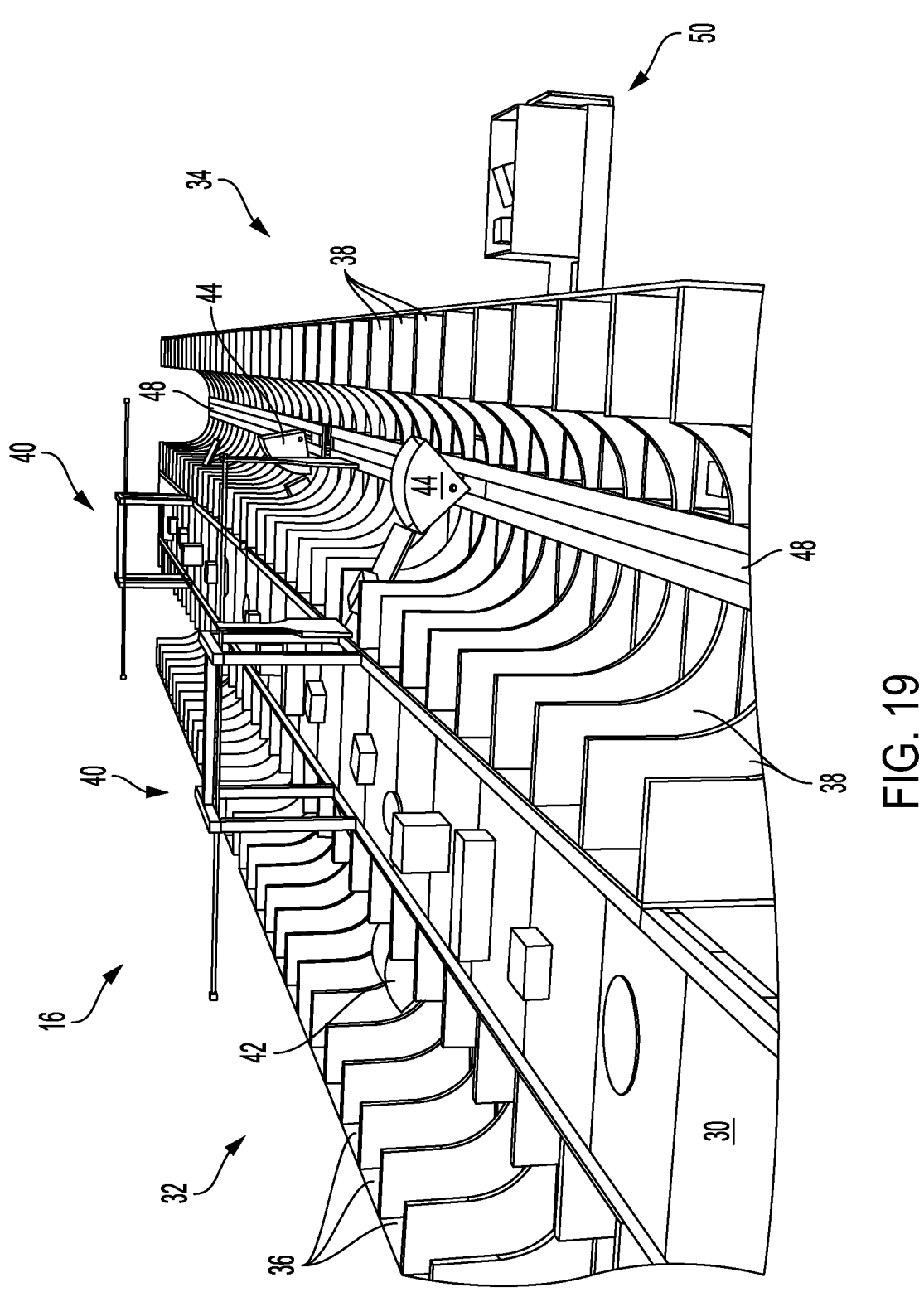
FIG. 19 shows an illustrative diagrammatic enlarged view of the output station of the system of FIG. 1.

Once grasped, the object may be directly placed onto the output conveyance system 30 as shown in FIG. 17, or and with reference to FIG. 18 the grasped object may be dropped into a drop perception system 98 either onto, or as directed by deflector 99, the output conveyance system 30. As shown in FIG. 19, the output station 16 may include diverters 40 that may selectively divert objects off of the conveyor 30 into reciprocating carriages 42, 44. Carriage 42 travels along track 46 between destination locations 36 of the shuttle wing 32, and carriage 44 travels along track 48 between destination locations 38 of the shuttle wing 34. As also shown in FIG. 18, a drawer 50 common to opposing destination locations (e.g., 36 or 38) may support output containers in the two opposing destination locations to permit removal of completed output containers at the destination locations.

Figure 20:
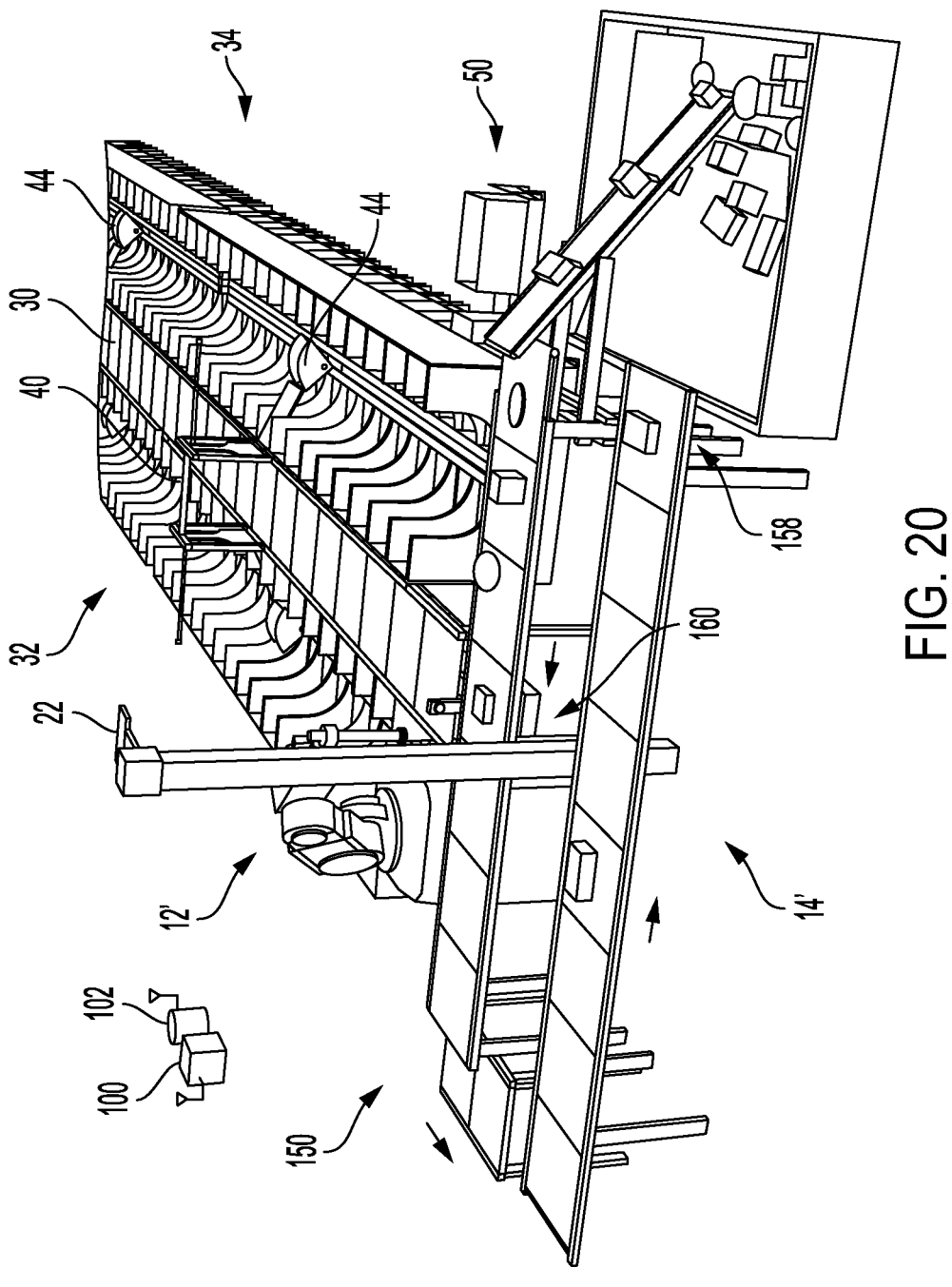
FIG. 20 shows an illustrative diagrammatic view of an object processing system incorporating an object recognition system in accordance with a further aspect of the invention that includes feeding and recirculating input conveyance system.

With further reference to FIG. 20, the input station 14' that may include instead of input containers, objects themselves that are provided, for example, from a common hopper 174 to an input area 176 of a feeding and recirculating input conveyance system 170 at an input station 14' by a cleated conveyor 172. The objects are provided one at a time to a loading area 180 at a processing station 12' where they are processed by the identification and grasp selection system discussed above. Any non-identified and/or non-selected objects are returned to a return area 178 where they are dropped back into the common hopper 174. By recirculating the objects, the object recognition system described herein may learn patch matches (and non-matches) from objects even if they are not yet selected for transport to the output conveyance system 30. In particular, the object recognition system may build the database of successful as well as unsuccessful matches as the objects are passed through the processing station 12'. When successful matches are determined, the objects are processed, and objects may be recirculated until sufficient matches are determined for each object, while the database is continuously updated. Since objects may be added to the hopper 174 (e.g., by human personnel) during operation, the number of different types of objects that may be processed (and provide information to the database) will increase significantly over time.

In accordance with various aspects, therefore, provides the identification of objects and the selection of grasp locations based on patch data that is generated based on features found in images taken of one or more objects. Those skilled in the art will appreciate that numerous modifications and variations may be made to the above disclosed embodiments without departing from the spirit and scope of the present invention.

What is claimed is:

1. An object recognition system in communication with a database, said object recognition system comprising:
    an image capture system for capturing at least one image of an object, and for providing image data representative of the captured image;
    a patch identification system in communication with the image capture system for receiving the image data, and for identifying more than one image patch associated with the captured image, each image patch being associated with a potential grasp location on the object, each potential grasp location being described as an area corresponding to a contact portion of an end effector of a programmable motion device;
    a feature identification system for capturing at least one feature of each image patch, the at least one feature of each image patch being a unique pattern exhibited by neighboring pixels within the image patch, for accessing feature image data in the database against which each captured at least one feature is compared to provide image feature comparison data, and for providing feature identification data responsive to the image feature comparison data; and
    an object identification system for providing object identity data responsive to the image feature comparison data, said object identity data including data representative of an identity of the object as well as at least one grasp location on the object.

2. The object recognition system as claimed in claim 1, wherein the contact portion of the end effector of the programmable motion device is a contact portion of a vacuum cup end effector.

3. The object recognition system as claimed in claim 1, wherein the contact portion of the end effector of the programmable motion device is an object-level patch that includes a contact portion of a vacuum cup end effector.

4. The object recognition system as claimed in claim 1, wherein the object identification system provides patch center data representative of a center of each patch, and the patch center data is provided responsive to the at least one captured feature.

5. The object recognition system as claimed in claim 1, wherein the object recognition system further includes an object image identification system in communication with the image capture system for receiving the image data, and for identifying an object associated with at least one object image associated with the captured image.

6. The object recognition system as claimed in claim 1, wherein the system prioritizes patch matches over model-free grasps.

7. The object recognition system as claimed in claim 1, wherein the system includes an input station at which objects are provided in input containers.

8. The object recognition system as claimed in claim 1, wherein the system includes an input station at which objects are provided on an input conveyor.

9. The object recognition system as claimed in claim 1, wherein the object recognition system further includes an additional scanner through which objects may be passed by the programmable motion device.

10. The object recognition system as claimed in claim 1, wherein the object recognition system further includes an output station that includes at least one shuttle wing sortation system.

11. An object processing system in communication with a database, said object processing system comprising:
    an input conveyor providing an input station at which a plurality of objects may be received;
    a plurality of containers at an output station at which the plurality of objects may be provided among a plurality of destination locations; and
    a programmable motion device operating at a processing station intermediate the input station and the output station, said processing station including:

an image capture system for capturing at least one image of an object of the plurality of objects, and for providing image data representative of the captured image;

a patch identification system in communication with the image capture system for receiving the image data, and for identifying more than one image patch associated with the captured image, each image patch being associated with a potential grasp location on the object;

a feature identification system for capturing at least one feature of each image patch, the at least one feature being a unique pattern in the image patch exhibited by neighboring pixels, for accessing feature image data in the database against which each captured at least one feature is compared to provide image feature comparison data; and an object identification system for providing object identity data responsive to the image feature comparison data, said object identity data including data representative of an identity of the object as well as at least one grasp location on the object.

12. The object processing system as claimed in claim 11, wherein each potential grasp location is described as an area that may be associated with a contact portion of the end effector of the programmable motion device.

13. The object processing system as claimed in claim 12, wherein the contact portion of the end effector of the programmable motion device is a contact portion of a vacuum cup end effector.

14. The object processing system as claimed in claim 12, wherein the contact portion of the end effector of the programmable motion device is an object-level patch that includes a contact portion of a vacuum cup end effector.

15. The object processing system as claimed in claim 11, wherein the object identification system provides patch center data representative of a center of each patch, and the patch center data is provided responsive to the at least one captured feature.

16. The object processing system as claimed in claim 11, wherein the object recognition system further includes an object image identification system in communication with the image capture system for receiving the image data, and for identifying an object associated with at least one object image associated with the captured image.

17. The object processing system as claimed in claim 11, wherein the system prioritizes patch matches over model-free grasps.

18. The object processing system as claimed in claim 11, wherein the system includes an input station at which objects are provided on an input conveyor that is fed by a cleated conveyor.

19. The object processing system as claimed in claim 11, wherein the object recognition system further includes a drop scanner through which objects may be dropped by the programmable motion device.

20. The object processing system as claimed in claim 11, wherein the output station includes at least one shuttle wing sortation system.

21. The object processing system as claimed in claim 11, wherein the input station includes a recirculating conveyor for recirculating objects to the processing station.

22. The object processing system as claimed in claim 21, wherein the input station further includes a feeding conveyor for providing objects from an input hopper to the input station.

23. A method of providing object recognition comprising:

capturing at least one image of an object, and for providing image data representative of the captured image;

receiving the image data, and for identifying more than one image patch associated with the captured image, each image patch being associated with a potential grasp location on the object, each potential grasp location being described as an area corresponding to a contact portion of an end effector of a programmable motion device;

capturing at least one feature of each image patch, the at least one feature of each image patch being a unique pattern exhibited by neighboring pixels within the image patch, for accessing feature image data in the database against which each captured at least one feature is compared to provide image feature comparison data, and for providing feature identification data responsive to the image feature comparison data; and providing object identity data responsive to the image feature comparison data, said object identity data including data representative of an identity of the object as well as at least one grasp location on the object.

24. The method as claimed in claim 23, wherein the contact portion of the end effector of the programmable motion device is a contact portion of a vacuum cup end effector.

25. The method as claimed in claim 23, wherein the contact portion of the end effector of the programmable motion device is an object-level patch that includes a contact portion of a vacuum cup end effector.

26. The method as claimed in claim 23, wherein the object identification system provides patch center data representative of a center of each patch, and the patch center data is provided responsive to the at least one captured feature.

27. The method as claimed in claim 23, wherein the method further includes identifying an object associated with at least one object image associated with the captured image.

28. The method as claimed in claim 23, wherein the method further includes prioritizing patch matches over model-free grasps.

29. The method as claimed in claim 23, wherein the method further includes dropping objects through a drop scanner onto an output conveyance system.

30. The method as claimed in claim 23, wherein the method further includes dropping objects from a reciprocating carriage into any of a plurality of destination locations based on the object identity data.

* * * * *